2,874,148

RESINIFICATION OF FURFURYL ALCOHOL AND FORMALDEHYDE AT HIGH HYDROGEN-ION CONCENTRATIONS

Lloyd H. Brown, Oak Park, Ill., assignor to The Quaker Oats Company, Chicago, Ill., a corporation of New Jersey No Drawing. Application July 29, 1954
Serial No. 446,675

3 Claims. (Cl. 260—67)

The present invention relates to the resinification of furfuryl alcohol with formaldehyde at high hydrogen-ion concentrations; and the products resulting therefrom.

It has long been known that furfuryl alcohol is capable of being directly converted into resinous condensation products either by heating or by the aid of acidic catalysts. It has likewise been known that furfuryl alcohol may be condensed with formaldehyde by the aid of acidic catalysts even without added heat. The latter reaction, however, is exothermic, and at high hydrogen-ion concentrations heat is generated so rapidly that it becomes difficult to control the reaction and produce condensation products of predetermined characteristics. As it is desirable to produce still liquid, though perhaps viscous, furfuryl alcohol-formaldehyde condensation products which have the property of being further curable, under controlled conditions of heat and acidity, to form insoluble and substantially infusible solid condensation products, a process which permits of the controlled production of furfuryl alcohol-formaldehyde condensation products has much commercial value.

It is therefore one of the objects of the present invention to provide a controllable process for the effective condensation of furfuryl alcohol and formaldehyde.

A further object is to provide a process for rapidly condensing formaldehyde, in the form of its commercial aqueous solutions, and in the presence of sufficient acid, with furfuryl alcohol while avoiding the deleterious effects of the exothermic nature of the reaction.

Other objects will become apparent from the further and more detailed description hereinbelow.

It has been found, in accordance with the present invention, that formaldehyde and furfuryl alcohol may be smoothly and controllably condensed even at relatively high hydrogen-ion concentrations by the expedient of gradually introducing furfuryl alcohol into a concentrated aqueous solution of formaldehyde, such as commercial formalin containing about 37% by weight of actual $CH_2O$, the solution having first been brought to a hydrogen-ion concentration greater than that corresponding to about pH 1.35; and in fact even as strong as pH 1.0 or more (i. e. more acid than pH 1). By reason of the relatively reduced amount present, the furfuryl alcohol, when introduced in small increments, for instance dropwise, over a prolonged period of time, will smoothly condense with the formaldehyde with the resutlant production of liquid resins, which are readily separable from the formed and residual water, and which may, after suitable partial neutralization (say to a pH of about 5), be relieved of their water content, both free as well as occluded, by vacuum distillation. The resulting liquid products may then be suitably acidified, as by means, for example of p-toluene sulfonic acid, and submitted to heat (and pressure, if desired) to form final infusible solid condensation products.

Such liquid furfuryl alcohol-formaldehyde condensation products find wide application in industry for the formation of acid-proof linings in chemical apparatus, for the setting of acid-resisting bricks, and as binders in the manufacture of chemical resistant products in conjunction with asbestos, glass fiber, carbon, diatomaceous earth, and the like.

As the process, by the proper choice of proportions and acids, may be controlled to yield liquid resinous condensation products of predetermined viscosities and curing characteristics, the process is highly useful.

The molar ratio of the reacting substances is open to a fairly wide choice; thus there may be used from 0.1 to 2.0 mols of actual $CH_2O$ to each mol of furfuryl alcohol, while the catalyst, most suitably sulfuric acid, may also be varied in amount, but enough should be used to impart to the initial reacting liquid a hydrogen-ion concentration of greater than that corresponding to pH 1.35 and preferably from about 1.3 to about 0.95. It was found that by adding the furfuryl alcohol drop by drop to a refluxing mixture of formalin and acid, the reaction could be readily controlled. While rapid reactions are obtained, the concentration of the furfuryl alcohol monomer is never high, so that the heat of the reaction is liberated gradually. Moreover, it is partly balanced by the heat required to heat the furfuryl alcohol as it is being added, while the dissipation of further heat is amply taken care of by the reflux which is being constantly returned to the reacting mixture, having of course been cooled by condensation in the reflux condenser.

As a more exact guide to the operation which forms the subject matter of the present application, the following examples are given.

EXAMPLE 1

Ten mililliters of 10% sulfuric acid were added to 750 grams of a 37% formaldehyde solution (commercial formalin). This produced a mixture which had a hydrogen-ion concentration of pH 1.30. This was transferred to a 5-liter 3-necked glass flask provided with a reflux condenser, a stirrer and a thermometer. The contents of the flask were gently heated until the temperature of the liquid contents was stabilized at about 93° C. Thereafter there were gradually added, drop by drop, 1,500 grams of furfuryl alcohol, the total time of addition being slightly more than an hour (65 minutes). The contents of the flask were heated throughout the reaction so that the liquid contents would be maintained at about 97° to 100° C., while reflux condensate was allowed to run back into the flask. After all the furfuryl alcohol had been introduced, the heating was continued for about ten minutes longer to assure that the reaction had substantially completed itself. The reaction products were then permitted to cool down, during which time the acidity was partly neutralized to about pH 5.0, by means of a 10% aqueous solution of sodium hydroxide. A lower layer of resin and an upper layer of water resulted. The latter was decanted, and the occluded water was removed from the liquid resin by vacuum distillation. The viscosity of the final product was about 725 centipoises at 25° C.

It is quite feasible to omit the decanting step and to remove all of the water by distillation.

ADDITIONAL EXAMPLES

As the general procedural steps are substantially the same as those given in detail in connection with Example 1, the other examples are shown in the form of the subjoined Table I.

Table I

| No. | CH$_2$O, weight | FA, weight | Catalyst | Added water, grams | pH | Time of FA addn. (min.) | Reflux time (min.) | Product |
|---|---|---|---|---|---|---|---|---|
| 2 | 150 g | 300 g | 3 0 ml | | 1.2 | 30 | 20 | Just became turbid. |
| 3 | 150 g | 300 g | 3.0 ml | | 1.2 | 15 | 15 | 500 cps. after decanting. |
| 4 | 750 g | 1,500 g | 28 ml | | 1.0 | 27 | | Solid. |
| 5 | 750 g | 1,500 g | 16 ml | | 1.15 | 60 | 5 | Just turbid. |
| 6 | 150 g | 300 g | 15.2 ml | 150 | 0.95 | 18 | 2 | Gel at room temp.; fluid at 60° C. |
| 7 | 150 g | 300 g | 10 ml | 150 | 1.25 | 14 | 2 | Over 100,000 cps. |
| 8 | 25.0# | 50# | 175 g | | 1.30 | 50 | 30 | Do. |
| 9 | 125 g | 1,500 g | 1.6 ml | | 1.30 | 38 | 150 | 20 cps. |
| 10 | 125 g | 1,500 g | 15 ml | 395 | 1.30 | 43 | 5 | Over 100,000 cps. |
| 11 | 1,620 g | 980 g | 21.6 ml | | 1.30 | 29 | 6 | Do. |

In this table CH$_2$O stands for formaldehyde, in the amount, by weight, of a 37% aqueous solution (commercial formalin); FA stands for furfuryl alcohol, also by weight; the catalyst is given in milliliters of a 10% aqueous solution of sulfuric acid; and the column "Reflux Time" designates the time period of the refluxing after all the furfuryl alcohol had been added. "Time of FA addn." means the length of time required to add all of the furfuryl alcohol, and "cps." in the table stands for centipoises at 25° C. The molar ratios of actual CH$_2$O per mol of furfuryl alcohol are as follows: For Examples 1 through 8 it is 0.6 of the CH$_2$O to 1 of the furfuryl alcohol, while in Examples 9 and 10 it is 0.1 to 1; and in Example 11, 2.0 to 1.

The yields are almost quantitative. Thus in Example 1 the yield of resin was 1410 grams, or 94% of the weight of the furfuryl alcohol; while in Example 8 it was 100% of the weight of the furfuryl alcohol.

Curing characteristics were obtained on the resins of Examples 1 and 8 (acetone extractables vs. time) with 0.25% p-toluene sulfonic acid catalyst at 320° F. The values obtained were: 6% and 7%, respectively, at 2 min.; 2.8% and 2.8% at 4 min.; 1.5% and 0.5% at 14 min. A resin of the same furfuryl alcohol-formaldehyde ratio, reacted at pH 2.5 using phosphoric acid as the catalyst, had a value of 13.5% at 2 min. This clearly demonstrates that the resins made at low pH (less than 1.35) are more reactive and therefore more versatile commercially.

The present process is not limited in any way to any particular type of apparatus, and while a glass flask has been described in connection with Example 1, it will be obvious that Example 8 required a much larger reaction vessel, which, in that case, was a glass-lined reactor of 20-gallon capacity. Any acid-resistant type of equipment may be used.

As all of these details are well known in the art, no illustrations accompany the present specification.

Other acids than sulfuric may be substituted, but sulfuric is the least expensive and entirely satisfactory. The small amounts of salts formed during the final neutralization have been found to be quite tolerable in the finished products.

I claim:

1. A controllable process for making a potentially curable resin from furfuryl alcohol and formaldehyde which comprises acidifying an aqueous solution of formaldehyde to a degree of acidity greater than that corresponding to pH 1.35, heating the resulting mixture under reflux to a temperature just below the boiling point of water, and then introducing furfuryl alcohol into said solution at a rate of between about .015 and .071 gram of furfuryl alcohol per minute per gram of furfuryl alcohol added.

2. A controllable process for making a potentially curable resin from furfuryl alcohol and formaldehyde which comprises acidifying an aqueous solution of formaldehyde to a degree of acidity greater than that corresponding to pH 1.35, heating the resulting mixture under reflux to a temperature just below the boiling point of water, and then introducing furfuryl alcohol into said solution at a rate of between about .015 and .071 gram of furfuryl alcohol per minute per gram of furfuryl alcohol added, said furfuryl alcohol being added in the ratio of between about .5 to 10 mols per mol of formaldehyde.

3. A controllable process for making a potentially curable resin from furfuryl alcohol and formaldehyde which comprises acidifying an aqueous solution of formaldehyde to a degree of acidity greater than that corresponding to pH 1.35, and then introducing furfuryl alcohol into said solution at a rate of between about .015 and .071 gram of furfuryl alcohol per minute per gram of furfuryl alcohol added, the process being conducted under reflux at a temperature of about 93° C. to 100° C. and continuing the maintenance of said temperature for a short time after all the furfuryl alcohol has been introduced; neutralizing the mixture to about pH 5.0 and then distilling water from the residual resin under vacuum.

References Cited in the file of this patent

UNITED STATES PATENTS

| | | |
|---|---|---|
| 2,343,972 | Harvey | Mar. 14, 1944 |
| 2,416,038 | Adams | Feb. 18, 1947 |